United States Patent
Johnston et al.

(10) Patent No.: US 10,764,136 B2
(45) Date of Patent: Sep. 1, 2020

(54) MITIGATING NETWORK IMPACT OF DISRUPTIVE DEVICE CHANGES

(71) Applicant: Cisco Technology, Inc., San Jose, CA (US)

(72) Inventors: Jay K. Johnston, Raleigh, NC (US); David C. White, Jr., Saint Petersburg, FL (US); Magnus Mortensen, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/433,402

(22) Filed: Jun. 6, 2019

(65) Prior Publication Data

US 2019/0288907 A1    Sep. 19, 2019

Related U.S. Application Data

(63) Continuation of application No. 15/443,571, filed on Feb. 27, 2017, now Pat. No. 10,355,929.

(51) Int. Cl.
*H04L 12/24* (2006.01)
*G06F 8/65* (2018.01)
*H04L 12/26* (2006.01)

(52) U.S. Cl.
CPC .............. *H04L 41/082* (2013.01); *G06F 8/65* (2013.01); *H04L 41/0836* (2013.01); *H04L 41/12* (2013.01); *H04L 41/145* (2013.01); *H04L 43/065* (2013.01); *H04L 43/0817* (2013.01)

(58) Field of Classification Search
None
See application file for complete search history.

(56) References Cited

U.S. PATENT DOCUMENTS

| | | |
|---|---|---|
| 6,285,688 B1 | 9/2001 | Henderson et al. |
| 7,873,505 B2 | 1/2011 | Bauer et al. |
| 8,212,683 B2 | 7/2012 | Klein et al. |
| 8,677,343 B2 | 3/2014 | Averbuch et al. |

(Continued)

OTHER PUBLICATIONS

Cisco, "Cisco Nexus 5000 Series NX-OS Software Upgrade and Downgrade Guide," Release 4.2(1)N1(1), OL-22748-01, http://www.cisco.com/c/en/us/td/docs/switches/datacenter/nexus5000/sw/upgrade/421_n2_1/b_Cisco_Nexus_5000_Series_NX-OS_Software_Upgrade_and_Downgrade_Guide Release_421.pdf, Jul. 2010, 40 pages.

*Primary Examiner* — Saumit Shah
(74) *Attorney, Agent, or Firm* — Edell, Shapiro & Finnan, LLC

(57) ABSTRACT

A computer-implemented method is provided for a network controller to implement an update on network elements with minimal disruption. The network controller receives a request to install the update on a number of network elements in one or more networks. Installing the update in each respective network element removes it from operation for an outage duration of time. The network controller identifies at least one set of critical network elements based on business factors associated with removing the critical network elements from operation. The network controller generates an update plan including timing for installing the update on each respective network element. The timing is based on minimizing the outage duration for the set of critical network elements. The network controller installs the update in each network element according to the timing of the update plan.

20 Claims, 8 Drawing Sheets

(56) References Cited

U.S. PATENT DOCUMENTS

| | | |
|---|---|---|
| 8,769,349 B2 | 7/2014 | Gotesdyner et al. |
| 9,077,627 B2 | 7/2015 | Bonas |
| 2011/0295925 A1 | 12/2011 | Lieblich et al. |
| 2012/0254395 A1 | 10/2012 | Bonas |
| 2013/0179877 A1 | 7/2013 | Dain |
| 2015/0124644 A1* | 5/2015 | Pani .................. H04L 12/18 370/254 |
| 2016/0315803 A1 | 10/2016 | Sadana et al. |
| 2018/0248750 A1 | 8/2018 | Johnston et al. |

* cited by examiner

MITIGATING NETWORK IMPACT OF DISRUPTIVE DEVICE CHANGES

CROSS-REFERENCE TO RELATED APPLICATIONS

This application is a continuation of U.S. application Ser. No. 15/443,571, filed Feb. 27, 2017, the entirety of which is hereby incorporated by reference herein.

TECHNICAL FIELD

The present disclosure relates to updating network elements across a large scale computer network.

BACKGROUND

Upgrading computing devices, such as network switches and routers, at a large scale may require outages and changes for thousands of devices. Occasionally, all of the devices will need to be upgraded as soon as possible. Planning and executing device upgrades across huge enterprise networks can be a challenge for large customers. For example, a severe security vulnerability might require upgrading thousands of interconnected routers as soon as possible. However, rebooting them all at once would cause a severe disruption and a total network outage. Alternatively, an uncoordinated upgrade may cause an even longer outage if dependent devices are in a series, and the upgrade is serial. This would break the only communication path multiple times, as each device in the path is upgraded. Upgrading each router in series may ensure that the upgrade of one device does not affect any other, but would result in a total upgrade time that would not correct a severe security vulnerability in a timely manner.

DESCRIPTION OF EXAMPLE EMBODIMENTS

Overview

In one embodiment, a computer-implemented method is provided for a network controller to implement an update on a plurality of network elements with minimal disruption. The network controller receives a request to install the update on the plurality of network elements in one or more networks. Installing the update in each respective network element of the plurality of network elements removes the respective network element from operation for an outage duration of time. The network controller determines how network flows will be distributed in the one or more networks during the outage duration of each respective network element, and generates an update plan that includes timing for installing the update on each respective network element. The timing is based on how the network flows will be distributed in the one or more networks. The network controller installs the update in each respective network element according to the timing of the update plan.

EXAMPLE EMBODIMENTS

Device upgrades can create particular challenges for customers with enterprise scale networks, due to the network disruption of the upgrade process. When a security vulnerability requires upgrading all of the network elements in a customer's enterprise network, network administrators should be cognizant of competing priorities, such as speed (implementing the upgrade as soon as possible) and network disruption (providing limited or no service during the upgrade).

In other situations, pre-emptive problem resolution may require network administrators to roll out upgrades to address issues that have not risen to the level of a security vulnerability. When hundreds or thousands of problems are detected and need to be automatically mitigated (and those mitigations may affect the network topology), the network administrators need to roll out the mitigation upgrades to the network while minimizing downtime.

Figure 1:
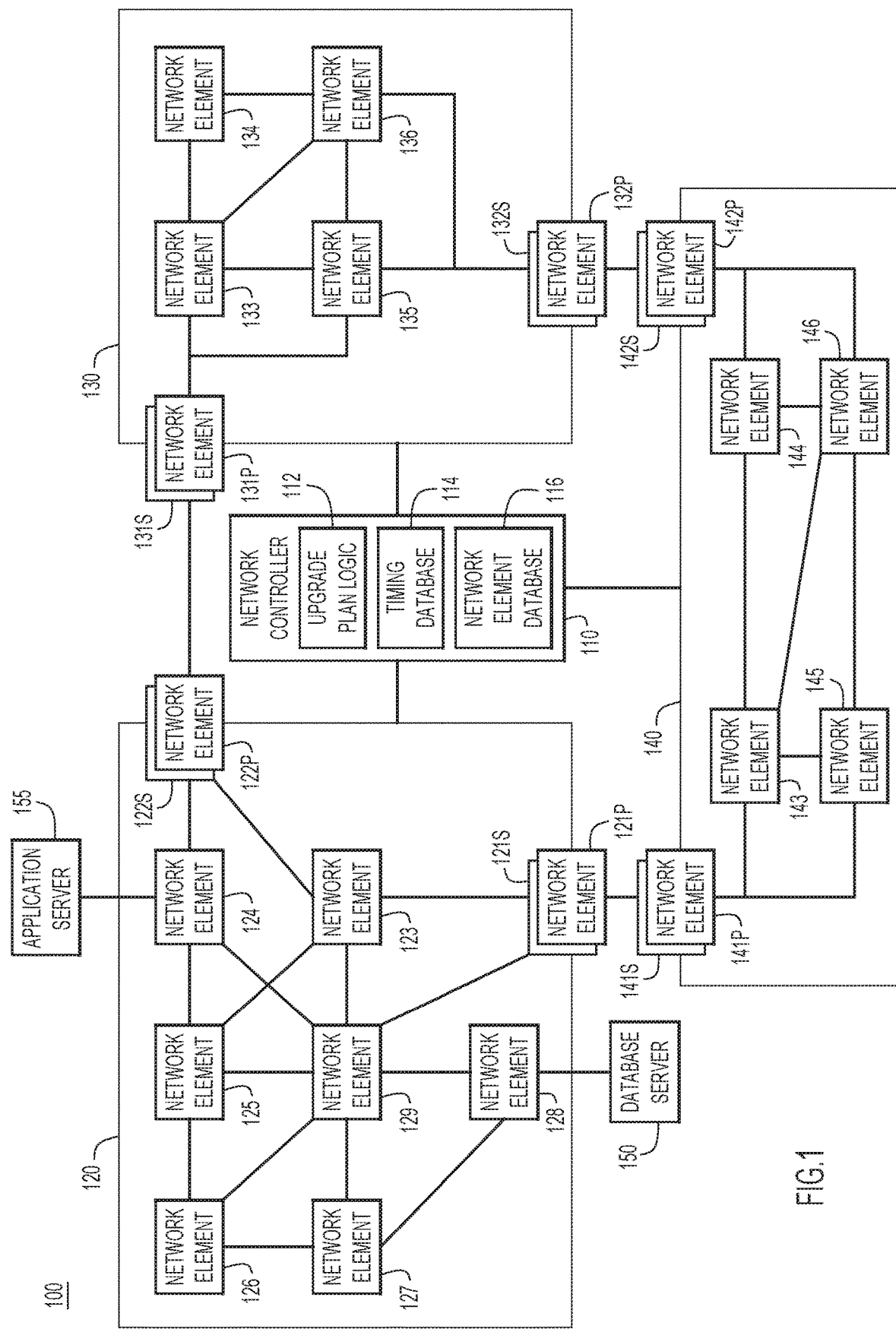
FIG. 1 is a simplified block diagram of a system of networks controlled by a network controller configured to upgrade the network elements, according to an example embodiment.

Referring now to FIG. 1, a simplified block diagram of an enterprise network system 100 is shown. A network controller 110 includes upgrade plan logic 112, a timing database 114, and a network element database 116. The network controller 110 controls network elements in network sites 120, 130, and 140. Network site 120 includes network elements 121P, 121S, 122P, 122S, 123, 124, 125, 126, 127, 128, and 129 in a partial mesh topology. The network elements 121P and 121S are redundant peers that serve as primary and secondary gateways for the network site 120 to communicate with the network site 140. The network element 121S serves as a backup to the network element 121P, and duplicates (or shares) the network links to neighboring network elements, such as network element 129 and network element 123. Similarly, network elements 122P and 122S are redundant peers that serve as primary and secondary gateways for the network site 120 to communicate with the network site 130.

In one example, redundant peers 121P and 121S are primary and secondary network elements, with the secondary network element 121S being designated as the backup for the primary network element 121P. Alternatively, the network elements 121P and 121S may be designated to carry different types of traffic, such as network element 121P carrying telepresence, video, and voice traffic and network element 121S carrying other (web, email, etc.) traffic. However, even when each redundant peer is designated to carry a specific type of traffic, each remains capable of carrying any type of traffic that its peer network element carries.

The network site 130 includes network elements 131P, 131S, 132P, 132S, 133, 134, 135, and 136 configured in a partial mesh topology. Network elements 131P and 131S are redundant peers that serve as primary and secondary gateways for the network site 130 to communicate with the network site 120 through network element 122P and/or network element 122S. Similarly, network elements 132P and 132S are redundant peers that serve as primary and secondary gateways for the network site 130 to communicate with the network site 140.

The network site 140 includes network elements 141P, 141S, 142P, 142S, 143, 144, 145, and 146 configured in a partial mesh topology. Network elements 141P and 141S are redundant peers that serve as primary and secondary gateways for the network site 140 to communicate with the network site 120 through network element 121P and/or network element 121S. Similarly, network elements 142P and 142S are redundant peers that serve as primary and secondary gateways for the network site 140 to communicate with the network site 130 through network element 132P and/or network element 132S.

In the network site 120, a database server 150 is connected to network element 128, and an application server 155 is connected to network element 124. In one example, the database server 150 and the application server 155 perform as a pair and rely on network connectivity to each other to perform their respective functions. As such, any downtime experienced by either network element 124 or 128 will result in the outage of the entire function.

In one example, the network controller 110 may be a central cloud controller, or an on-premise controller, such as a Software Defined Networking (SDN) controller or a legacy network management product. The network controller 110 stores existing topology and device configuration knowledge in the network element database 116. The upgrade plan logic 112 in network controller 110 can intelligently roll out network element software upgrades (or other disruptive changes that bring a network element offline) to network elements in such a way that would minimize total network downtime, and keep high priority services available as much as possible. For instance, the network controller 110 may determine which network elements have redundant peers from the network element database 116. The presence or absence of redundant peers may factor in to the upgrade plan logic 112 when determining when to schedule upgrades of network elements.

In another example, the network controller 110 receives a change request that must be implemented on some or all of the network elements in the network sites 120, 130, and/or 140. The change request may originate from an automatic problem detection and resolution system, which troubleshoots network issues and determines an appropriate correction for each issue. While FIG. 1 shows a limited number of network elements in three separate network sites, the change request may be directed at upgrading hundreds or thousands of network elements in any number of network sites.

Upon receiving the change request, the network controller 110 gathers technical and business factors that may impact the implementation of the change in the network elements. These factors may include which network elements need to be upgraded, how long the upgrade will take on each network element, how long the outage period for upgrading each network element, whether each network element has an attached redundant peer, the bandwidth available on certain network links (and if re-convergence due to changes would overload those links), alternate paths around each network element, critical exposed systems or paths that should be upgraded first, critical systems or paths for which downtime should be minimized, time periods during which network elements can or cannot be upgraded, and/or downtime allowed by service level agreements for specific services.

In one example, the network controller 110 gathers information, such as timing information, from an external service, such as a cloud-based service. In other words, the network controller may query a cloud-based service to determine various aspects of the time periods required for installing the requested upgrade. For instance, the network controller 110 may send a request to a network equipment vendor's cloud-based service to determine the length of time the vendor expects a network element to install the upgrade. The request may specify the type of network equipment, the current version of the firmware installed on the network equipment, and the new version of the firmware that the upgrade will install. The vendor may accumulate statistics on how long each particular model takes to upgrade from each particular version to the next version, and provide an estimate of the timing of the upgrade. The estimate may include estimates on different portions of the upgrade process, such as preparing the network element for the upgrade, rebooting the network element, and any subsequent setup after the network element has been brought back online. In particular, the network controller 110 may query the external service for an estimate on the total length of time for the upgrade, as well as how much of the total time the network element will be removed from service, such as when it is rebooting.

The upgrade plan logic 112 of the network controller 110 calculates an upgrade plan using knowledge of the network topology, device configuration, and other technical and/or business factors. The upgrade plan may be a step-by-step upgrade plan, which rolls out the upgrade to a subset of the network elements in each step until all of the network elements have received and implemented the upgrade. Additionally, the network administrator may be provided an upgrade plan report, which includes estimated upgrade times and outages to various parts of the network. The network administrator may choose to modify the upgrade plan before implementing it and rolling out the upgrade to the network elements.

In one example, the controller 110 calculates the upgrade plan by simulating how network flows will re-converge around network elements as they are removed from service for the upgrade. Additionally, each network element will need to download a potentially large upgrade package, and may require other network elements that need to be upgraded (and taken offline). The controller 110 may simulate the bandwidth requirements for each network element throughout the upgrade process as each network element is removed from service. Even while maintaining network connectivity, removing some network elements from service may reduce the available bandwidth available for other network elements to download the upgrade package. The controller 110 may simulate the network effects of the upgrade process in order to maintain appropriate service requirements, such as service level agreements, throughout the upgrade process.

In another example, the network elements may be implemented on one or more virtual machines, and the upgrade process for a particular network element includes cloning the virtual machine on which the particular network element resides. Once the cloned virtual machine boots up with the upgrade installed on the network element, two versions of the network element may be available. A network administrator can complete the upgrade for the network element by activating the cloned virtual machine with the upgrade and killing the old virtual machine that does not include the upgrade.

After the upgrade is implemented an output report may be generated for the network administrator. The output report includes overall uptimes (expressed as a percentage) for devices and services and displayed with Key Performance Indicators (KPIs). The calculated uptime percentage and KPIs may be useful for the network administrator to determine if the network is approaching (or would exceed) a minimum uptime threshold, which may affect contractual obligations.

Referring now to FIGS. 2A-2D, a step-by-step upgrade of the network system 100 is shown. Network controller 110 has performed its calculations and divided the network elements of the three network sites 120, 130, and 140 into four groups/steps. After the first group is reloaded and operational, the second group can be rebooted, and so forth until all four groups have completed the upgrade. The complete connectivity graph of the network is maintained even when certain network elements are rebooted because the upgrade plan removes the network elements from operations such that the network paths will re-converge around the upgrading network elements.

Figure 2A:
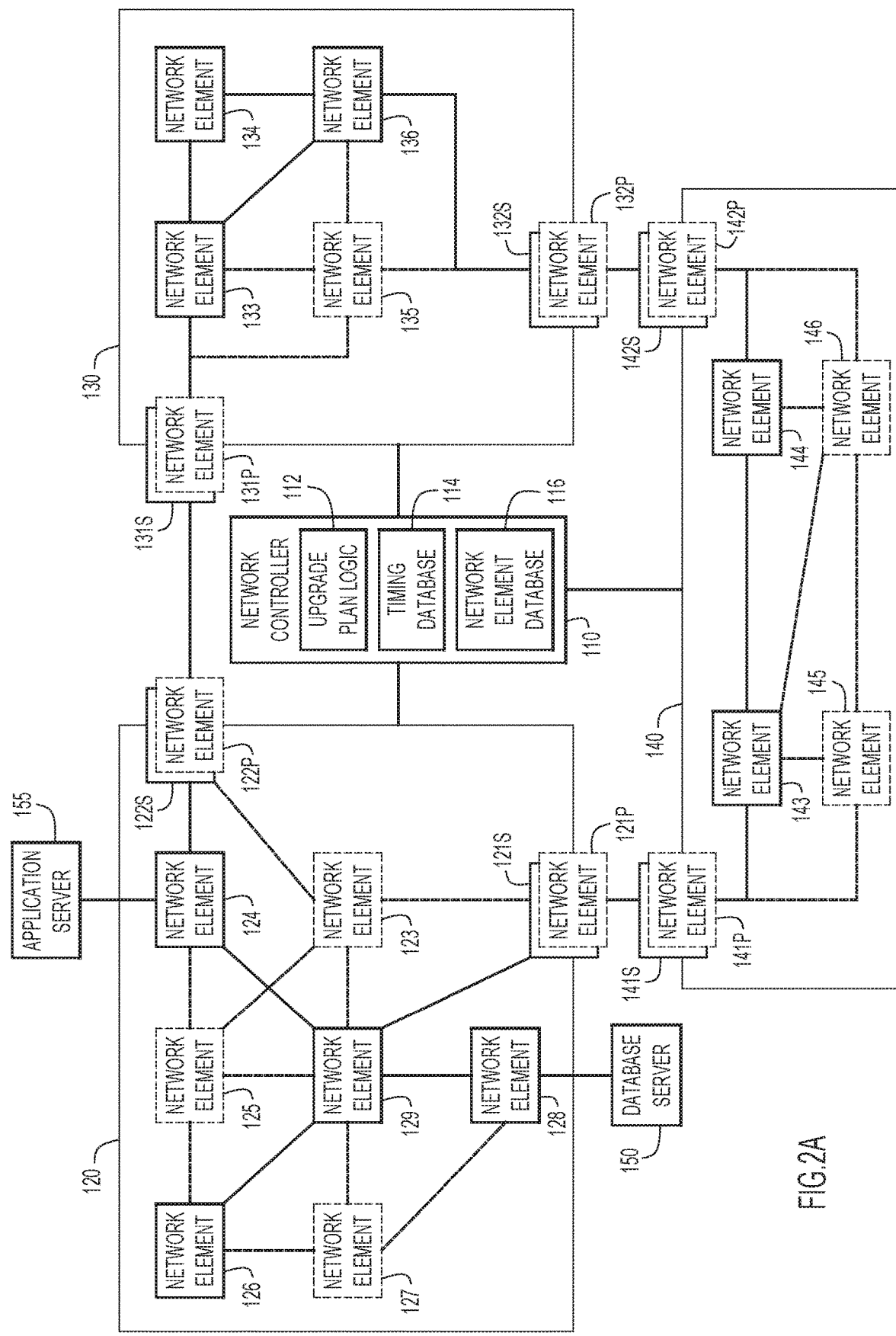
FIGS. 2A-2D illustrate steps in an upgrade plan, as each network element is taken offline to perform the upgrade, according to an example embodiment.

Referring specifically to FIG. 2A, the first step in an upgrade plan of the network system 100 is shown. Network elements are shown in dashed lines to signify that they have been removed from operation during this step to perform the upgrade. In the network site 120, network elements 121P, 122P, 123, 125, and 127 are upgraded in the first step. Network links from/to the network elements 121P and 122P are not broken, due to their redundant peers 121S and 122S. However, any network links with the upgrading network elements 123, 125, and 127 are shown in dashed lines to indicate that these links are not available. Each of the network elements 121S, 122S, 124, 126, 128, and 129 that are not currently removed from operation maintain connectivity to each other and to the other network sites 130 and 140.

In the network site 130, network elements 131P, 132P, and 135 are upgraded in the first step. Network links from/to the network elements 131P and 132P are not broken, due to their redundant peers 131S and 132S. However, any network links with the upgrading network element 135 are shown in dashed lines to indicate that these links are not available. Each of the network elements 131S, 132S, 133, 134, and 136 that are not currently removed from operation maintain connectivity to each other and to the other network sites 120 and 140.

In the network site 140, network elements 141P, 142P, 145, and 146 are upgraded in the first step. Network links from/to the network elements 141P and 142P are not broken, due to their redundant peers 141S and 142S. However, any network links with the upgrading network elements 145 and 146 are shown in dashed lines to indicate that these links are not available. Each of the network elements 141S, 142S, 143, and 144 that are not currently removed from operation maintain connectivity to each other and to the other network sites 120 and 130.

Figure 2B:
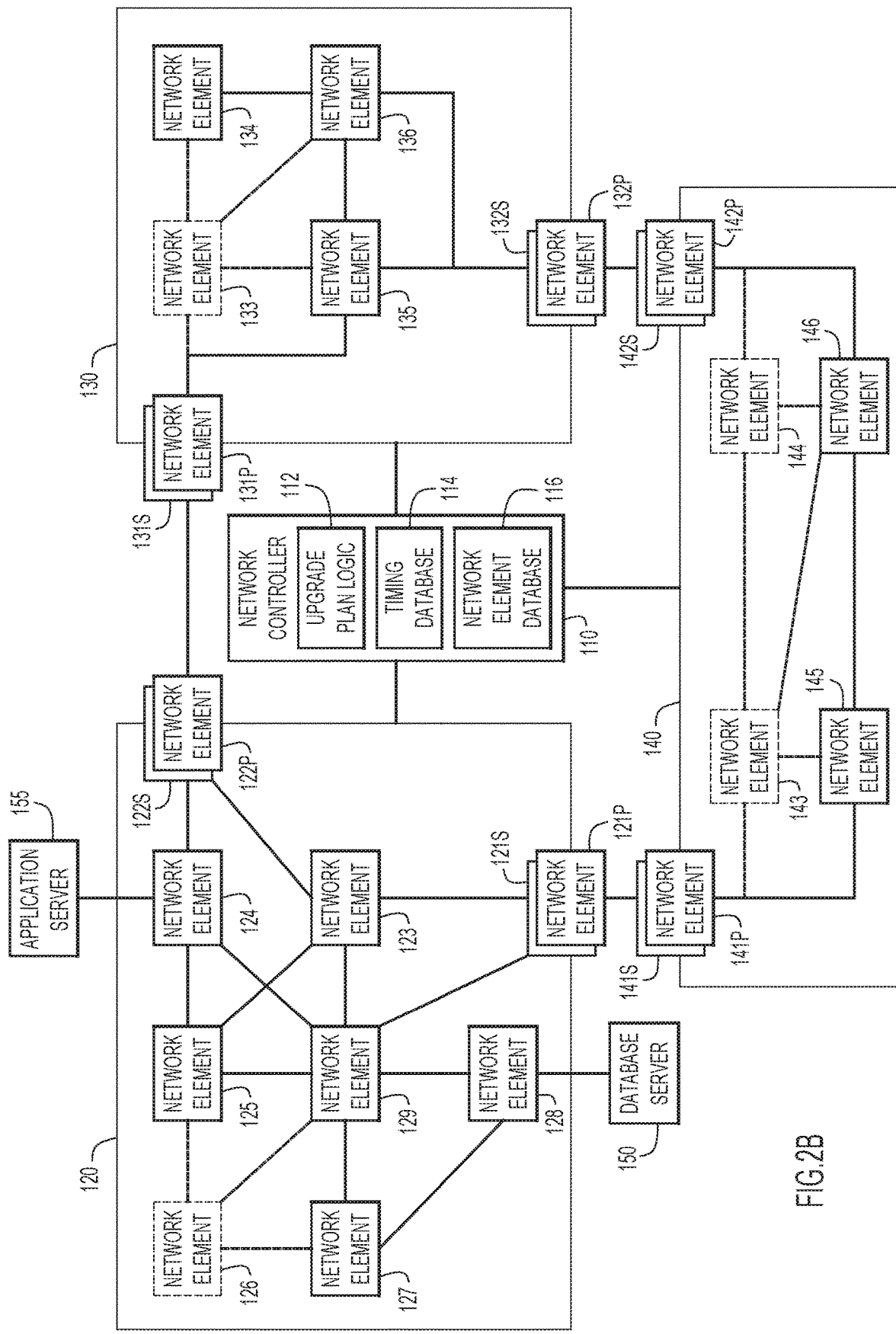

Referring now to FIG. 2B, the second step in an upgrade plan of the network system 100 is shown. Network elements are shown in dashed lines to signify that they have been removed from operation during this step to perform the upgrade. In the network site 120, network element 126 is upgraded in the second step. The network links with the upgrading network element 126 are shown in dashed lines to indicate that these links are not available. Each of the network elements 121P, 121S, 122P, 122S, 123, 124, 125, 127, 128, and 129 that are not currently removed from operation maintain connectivity to each other and to the other network sites 130 and 140.

In the network site 130, network element 133 is upgraded in the second step. The network links with the upgrading network element 133 are shown in dashed lines to indicate that these links are not available. Each of the network elements 131P, 131S, 132P, 132S, 134, 135, and 136 that are not currently removed from operation maintain connectivity to each other and to the other network sites 120 and 140. Similarly, in the network site 140, network elements 143 and 144 are upgraded in the second step. The network links with the upgrading network elements 143 and 144 are shown in dashed lines to indicate that these links are not available. Each of the network elements 141P, 141S, 142P, 142S, 145, and 146 that are not currently removed from operation maintain connectivity to each other and to the other network sites 120 and 130.

Figure 2C:
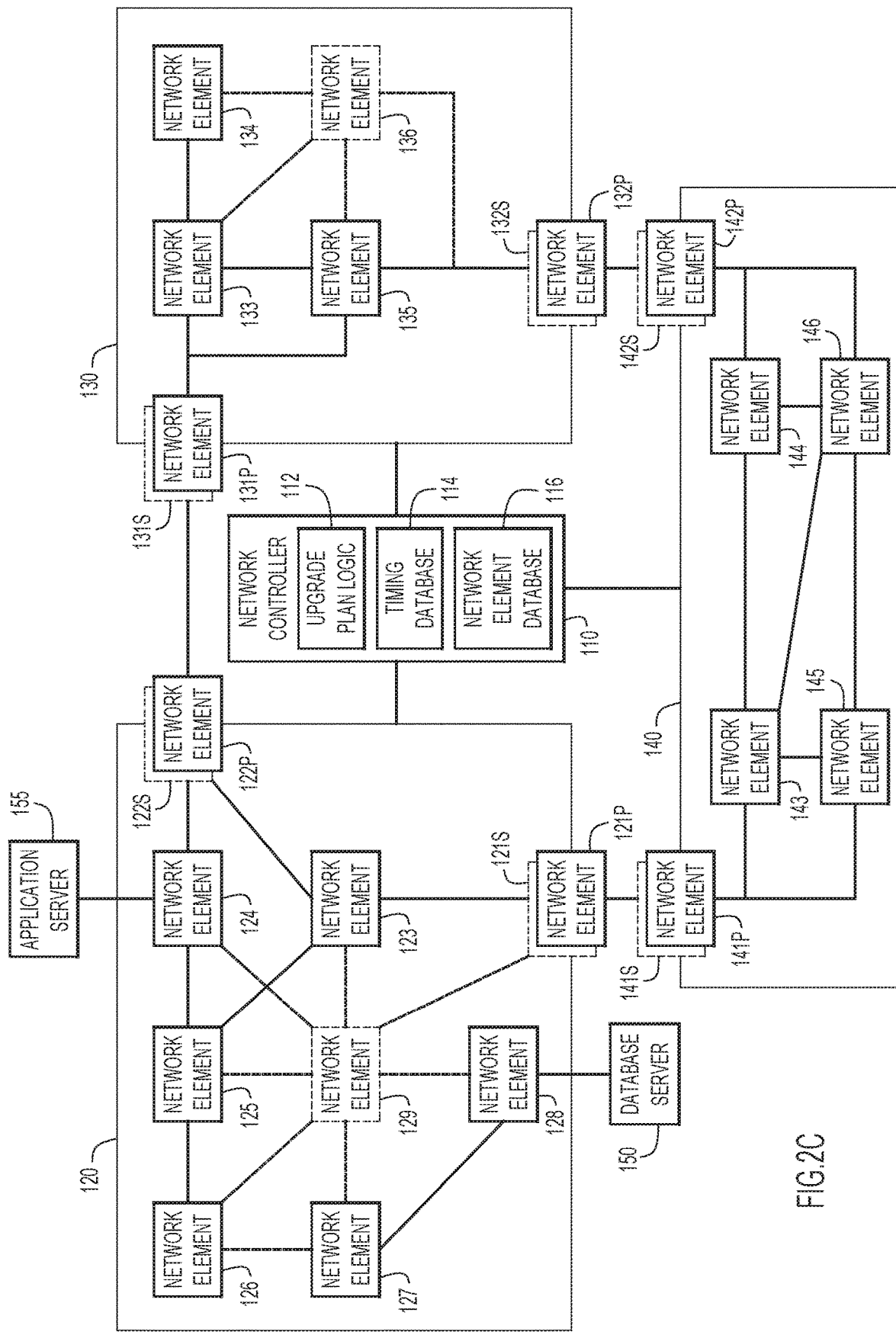

Referring now to FIG. 2C, the third step in an upgrade plan of the network system 100 is shown. Network elements are shown in dashed lines to signify that they have been removed from operation during this step to perform the upgrade. In the network site 120, network elements 121S, 122S, and 129 are upgraded in the third step. Network links from/to the network elements 121S and 122S are not broken, due to their redundant peers 121P and 122P. However, any network links with the upgrading network element 129 are shown in dashed lines to indicate that these links are not available. Each of the network elements 121P, 122P, 123, 124, 125, 126, 127, and 128 that are not currently removed from operation maintain connectivity to each other and to the other network sites 130 and 140.

In the network site 130, network elements 131S, 132S, and 136 are upgraded in the third step. Network links from/to the network elements 131S and 132S are not broken, due to their redundant peers 131P and 132P. However, any network links with the upgrading network element 136 are shown in dashed lines to indicate that these links are not available. Each of the network elements 131P, 132P, 133, 134, and 135 that are not currently removed from operation maintain connectivity to each other and to the other network sites 120 and 140. Similarly, in the network site 140, network elements 141S and 142S are upgraded in the third step. Network links from/to the network elements 141S and 142S are not broken, due to their redundant peers 141P and 142P. Each of the network elements 141P, 142P, 143, 144, 145, and 146 that are not currently removed from operation maintain connectivity to each other and to the other network sites 120 and 130.

Figure 2D:
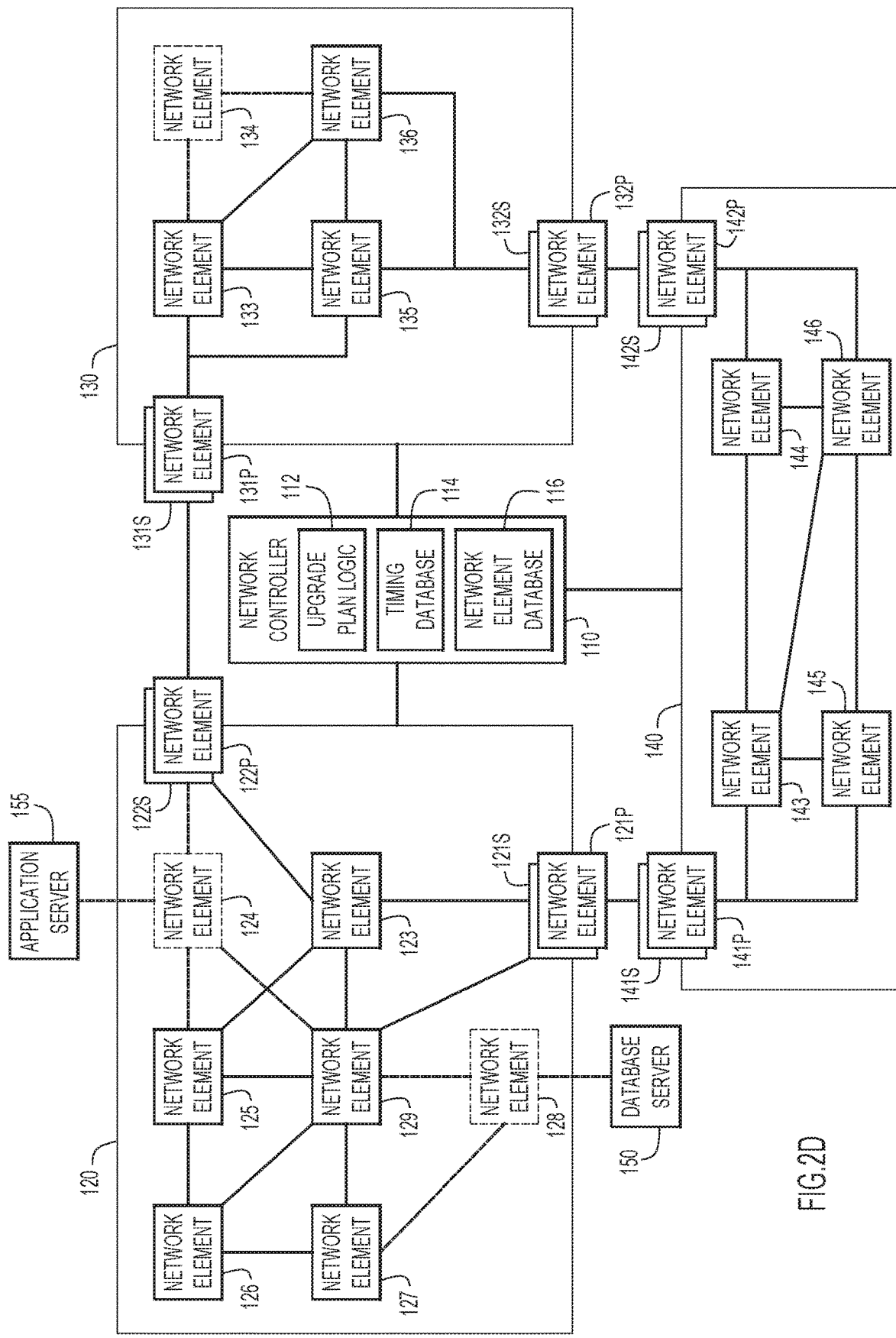

Referring now to FIG. 2D, the fourth step in an upgrade plan of the network system 100 is shown. Network elements are shown in dashed lines to signify that they have been removed from operation during this step to perform the upgrade. In the network site 120, network elements 124 and 128 are upgraded in the fourth step. The network links with the upgrading network elements 124 and 128 are shown in dashed lines to indicate that these links are not available. Each of the network elements 121P, 121S, 122P, 122S, 123, 125, 126, 127, and 129 that are not currently removed from operation maintain connectivity to each other and to the other network sites 130 and 140.

In the network site 130, network element 134 is upgraded in the fourth step. The network links with the upgrading network element 134 are shown in dashed lines to indicate that these links are not available. Each of the network elements 131P, 131S, 132P, 132S, 133, 135, and 136 that are not currently removed from operation maintain connectivity to each other and to the other network sites 120 and 140. All of the network elements in network site 140 have already been upgraded in one of the first three steps shown in FIGS. 2A-2C. Hence, none of the network elements in the network site 140 are removed from operation.

In one example, the upgrade plan shown in FIGS. 2A-2D is determined by a process that considers both the topology of the network system 100 as well as the function (e.g., business use) of different network elements and computing devices connected to the network elements. For instance, the connectivity between the database server 150 and the application server 155 may be business critical. In other words, any upgrade/change that affects this communication between these computing devices should be last. Additionally, since the application server 155 and the database server 150 cannot function without connectivity to each other, both of the connecting network elements 124 and 128 are upgraded at the same time (in the fourth step shown in FIG. 2D) to minimize the downtime of the connection between the database server 150 and the application server 155.

In an alternative example not shown in FIGS. 2A-2D, the network site 130 may be a newly provisioned site that is not being used yet. Additionally, the network site 130 may be a site that that does not use any resources during a specific time of the day, such as overnight. In this case, all of the network elements in the site 130 may be upgraded at the same time, since there are no users that require the connectivity of the network site 130.

Figure 3:
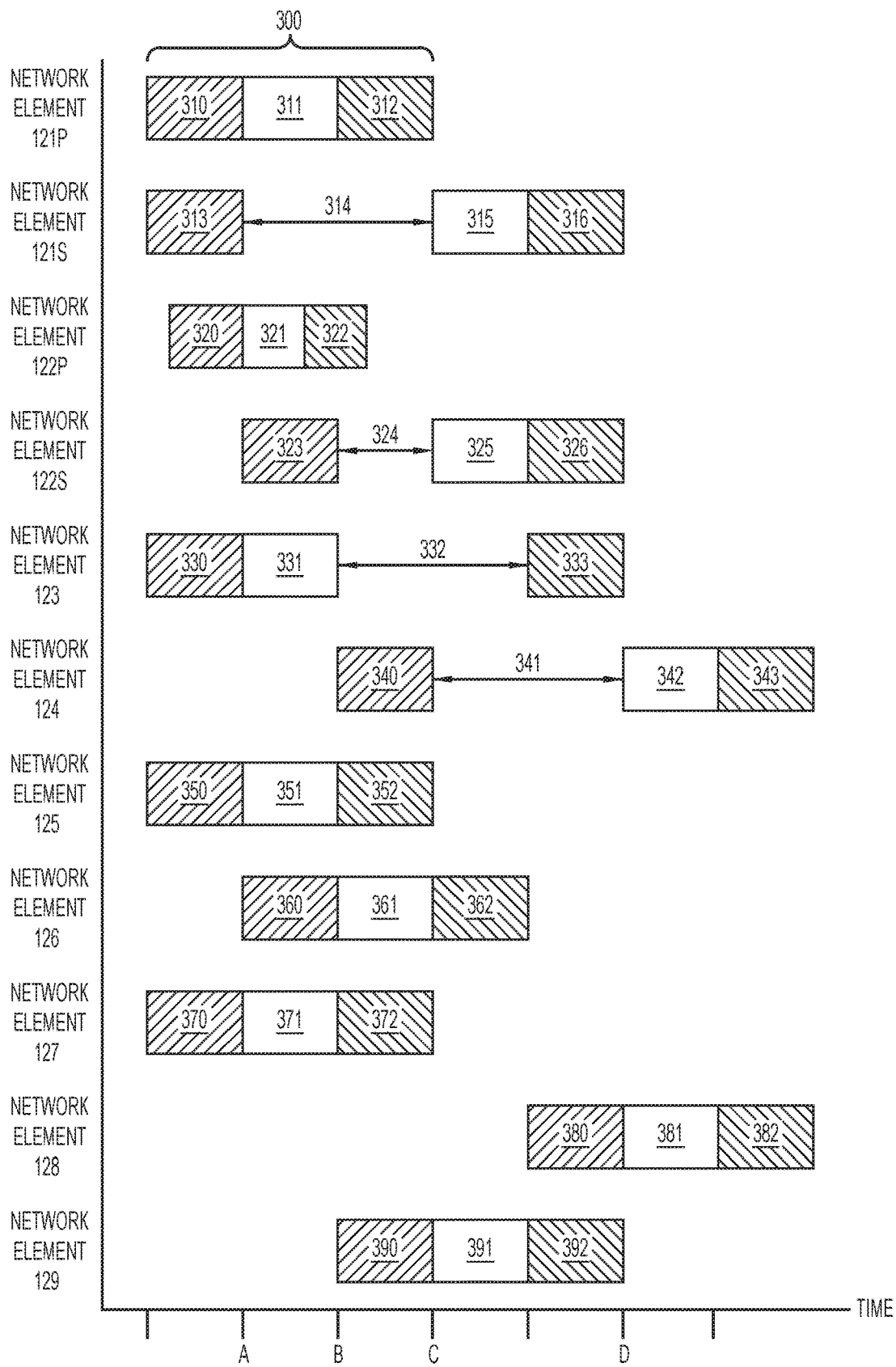
FIG. 3 is a timing diagram illustrating steps taken to upgrade a portion of the network system, according to an example embodiment.

Referring now to FIG. 3, a timing diagram illustrates aspects of the upgrade plan for the network elements of the network site 120. The network element 121P is used to illustrate an upgrade process that lasts for a duration of time 300 (the upgrade duration). Within the upgrade duration of time 300, the network element 121P prepares for the upgrade for an initial duration of time 310, halts any network activity for a second period of time 311 (the outage duration), and performs any additional configuration setup during a third period of time 312. As shown in FIG. 2A, the upgrade plan schedules the network element 121P to be offline in the first step, scheduled for time A. The network element 121P is only removed from service during the time period 311, which begins at time A.

In one example, the network element 121P downloads the upgrade software during the initial time period 310 and runs any initial scripts or processes to prepare the network element 121P to install the update, while maintaining normal network connectivity. After downloading the upgrade, the network element 121P may reboot to install the update during the second time period 311. After the network element 121P has booted up, it completes any additional configuration changes that may be necessary to complete the upgrade process during time period 312. For instance, any conversion or transformation that would be required of the configuration of the network element 121P, or any upgrades to the structures of databases within the network element 121P. During the time period 312, the network element 121P may resume normal network connectivity. Typically, the network element 121P is only removed from service for a limited portion (outage duration 311) of the time that the upgrade is proceeding (the upgrade duration 300). However, the outage duration 311 may take up most or all of the upgrade duration 300 in some circumstances.

The upgrade plan schedules the network element 121S to be offline during the third step of the upgrade process, as shown in FIG. 2C, which begins at time C. However, the network element 121S prepares for the upgrade, e.g., by downloading the upgrade, during the time period 313. The network element 121S then waits for the time 314 before the scheduled outage time C to remove the network element for the outage duration 315. After the network element 121S is back online, it completes the upgrade during the time period 316.

The upgrade plan schedules the network element 122P to be offline during the first step of the upgrade process, as shown in FIG. 2A, which begins at time A. The network element 122P prepares for the upgrade during the time period 320. The network element 122P is removed for service for the outage duration 321, and completes the upgrade process during the time period 322. In one example, the time periods 320, 321, and/or 322 for upgrading the network element 122P are shorter than the time periods 310, 311, and 312, respectively, for upgrading the network element 121P. For instance, the network element 122P may be closer to the server providing the upgrade, or the network element 122P may have more bandwidth available to download the upgrade, or the upgrade file for network element 122P may be smaller. In these circumstances, the preparation time period 320 of the network element 122P may be shorter than the corresponding preparation time period 310 of the network element 121P.

The network element 122S is scheduled to be offline during the third step of the upgrade process, as shown in FIG. 2B, which begins at time C. The network element 122S prepares for the upgrade during the time period 323, which is delayed from the initial time periods 310, 313, and 320 of the network elements 121P, 121S, and 122P, respectively. In one example, the upgrade plan delays the preparation time period 323 to alleviate network congestion arising from a large number of network elements downloading the upgrade as soon as the upgrade process begins. After the initial preparation time period 323, the network element 122S waits for the time period 324, until the scheduled time C for the network element 122S to be removed from service. The network element 122S is removed from service during the outage time 325, and completes the upgrade process during the time period 326, after the network element 122S has been brought back into service.

The network element 123 is scheduled to be offline during the first step of the upgrade process, as shown in FIG. 2A, which begins at time A. The network element 123 prepares for the upgrade during the time period 330, and is removed for service for the outage duration 331. The network element 123 waits for a period of time 332 before completing the upgrade process during the time period 333. In one example, a network administrator may delay switching the functionality of the network element 123 from one virtual machine to a cloned (and then upgraded) virtual machine for the period of time 332.

The upgrade plan schedules the network element 124 to be offline during the fourth and final step of the upgrade process, as shown in FIG. 2D, which begins at time D. The network element prepares for the upgrade during time period 340, and waits for the time period 341 until the scheduled time D. The network element 124 is removed from service during the outage time period 342 and completes the upgrade process during time period 343. In one example, the upgrade plan may schedule the network element 124 to be taken offline for the outage period 342 at a specific time of day to minimize disruption. For instance, as discussed with reference to FIG. 2D, network elements 124 and 128 are removed from service at the same time to minimize the downtime of the connectivity between the database server 150 attached to network element 128 and the application server 155 attached to network element 124. Historical usage data may cause the upgrade plan logic to schedule the outage period for these two network devices during a typical lull in network activity between the two servers.

The upgrade plan schedules the network element 125 to be offline during the first step of the upgrade process, as shown in FIG. 2A, which begins at time A. The network element 125 prepares for the upgrade during the time period 350. The network element 125 is removed for service for the outage duration 351, and completes the upgrade process during the time period 352.

The upgrade plan schedules the network element 126 to be offline during the second step of the upgrade process, as shown in FIG. 2B, which begins at time B. The network element 126 prepares for the upgrade during the time period 360. The network element 126 is removed for service for the outage duration 361, and completes the upgrade process during the time period 362.

The upgrade plan schedules the network element 127 to be offline during the first step of the upgrade process, as shown in FIG. 2A, which begins at time A. The network element 127 prepares for the upgrade during the time period 370. The network element 127 is removed for service for the outage duration 371, and completes the upgrade process during the time period 372.

The upgrade plan schedules the network element 128 to be offline during the fourth step of the upgrade process, as shown in FIG. 2D, which begins at time D. The network element 128 prepares for the upgrade during the time period 380. The network element 128 is removed for service for the outage duration 381, and completes the upgrade process during the time period 382.

The upgrade plan schedules the network element 129 to be offline during the third step of the upgrade process, as shown in FIG. 2C, which begins at time C. The network element 129 prepares for the upgrade during the time period 390. The network element 129 is removed for service for the outage duration 391, and completes the upgrade process during the time period 392.

In one example, the controller 110 may determine the length of time for each time period, such as the outage period 311 for upgrading network element 121P, based on empirical data from similar network elements. For instance, if the outage period 311 is largely determined by the amount of time that the network element 122P requires to boot, then the boot duration of the network element 122P (or a similar network element) may be used by the controller to predict the outage period 311. Additionally, the controller 110 may upgrade a similar device in an edge part of the network and measure the upgrade/outage duration. The controller 110 may take into account previous upgrade/outage times that previous upgrades have taken on the same network element 122P.

The controller 110 may also receive metadata about upgrade/outage time requirements from a central, potentially anonymous, source. The central source may collect the metadata from similar customers' network devices performing the same upgrade. In this way, the controller 110 can leverage community knowledge of the upgrade/outage duration into a simulation of the upgrade process. Some or all of this empirical timing data may be stored by the controller 110 in the timing database 114, and used to more accurately simulate one or more of the components of the upgrade period 300 for the network element 122P.

In another example, the controller 110 may use different algorithms to determine the upgrade plan. The different algorithms may give different weightings to different dimensions and performance metrics. For instance, one algorithm may schedule the network elements to be upgraded more quickly at the expense of a penalty in uptime of the network. Alternatively, the network might have no downtime tolerance, and require the number of upgrade groups to be increased to achieve zero downtime at the expense of a lengthened timeline. Additionally, a network administrator may revise the upgrade plan generated by the controller 110 in order to shift the priorities of the upgrade plan.

Different approaches may be used to group the network elements and specify the upgrade order and timing. For instance, Prim's algorithm may be used to calculate the minimum number of links that must be maintained to keep the entire network active, and then reboot the network elements in an order that keeps the minimum number of links active. Prim's algorithm could be augmented to account for other restrictions, such as network bandwidth of the links and projected bandwidth usage as the topology changes, as well as the business criticality of the network elements and how that affects the time of day that the network elements can be removed for service.

Figure 4:
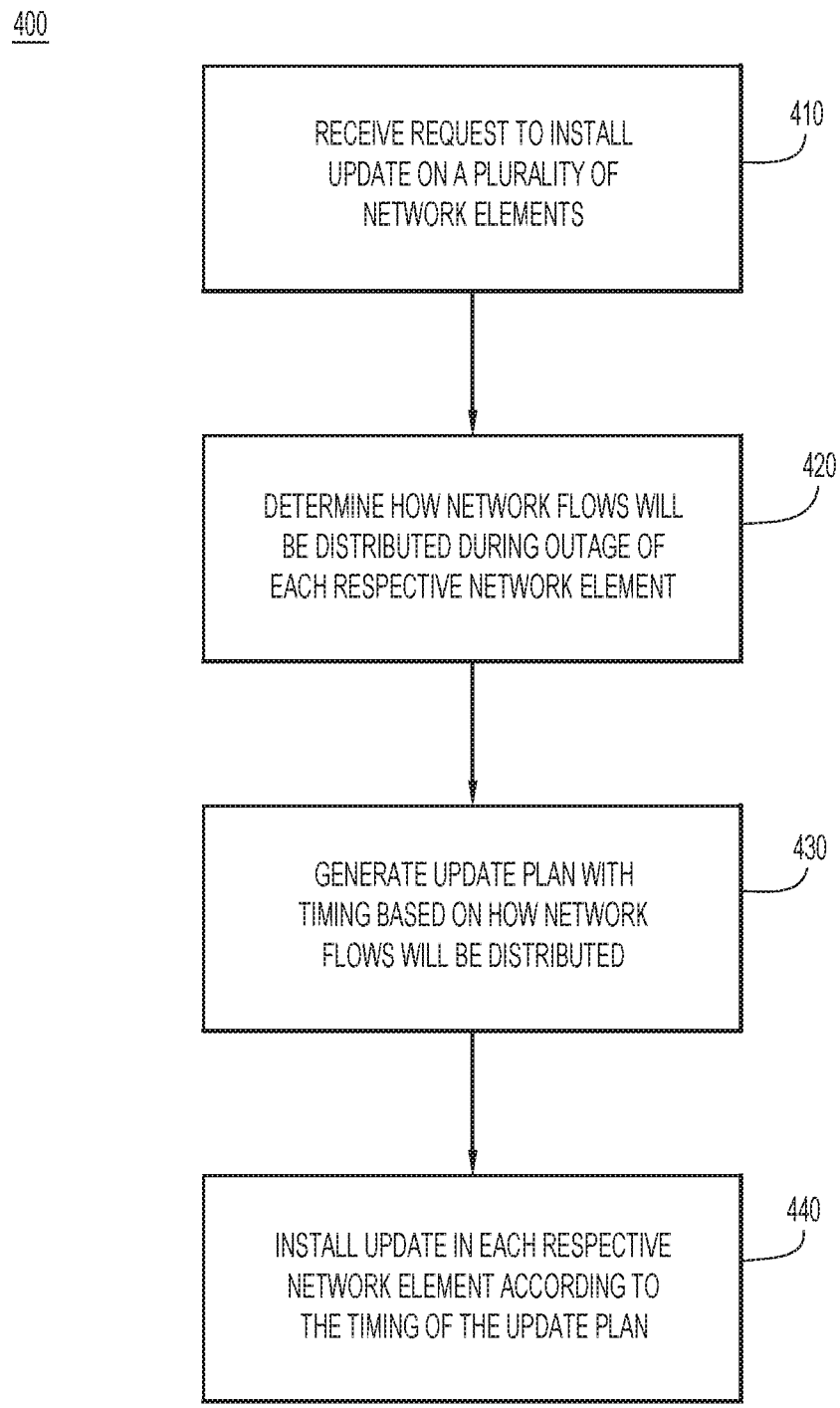
FIG. 4 is a flow chart illustrating the operations performed by a network controller in implementing an upgrade plan, according to an example embodiment.

Referring now to FIG. 4, a flow chart is shown that illustrates operations performed by a network controller, such as controller 110, in a process 400 for installing an update in a plurality of network elements. In step 410, the network controller receives a request to install an update on a plurality of network elements in one or more networks, which requires each network element to be removed from operation for an outage duration of time. In one example, the request may be received from an automated problem detection and resolution system. Alternatively, the request may be received from a network administrator. In step 420, the controller determines how network flows in the network will be distributed during the outage duration of each network element. In one example, the controller simulates how the network flows re-converge around one or more network elements as they are removed from service. The controller may also obtain upgrade timing information from an external source, or from other network elements, to refine the simulation of how the network flows re-converge around removed network elements.

In step 430, the controller generates an update plan based on how the network flows will be distributed in the network. The update plane includes timing for installing the update on each of the network elements based on the impact of removing each network element from service in the network. In step 440, the controller installs the update in each respective network element according to the timing of the update plan.

Figure 5:
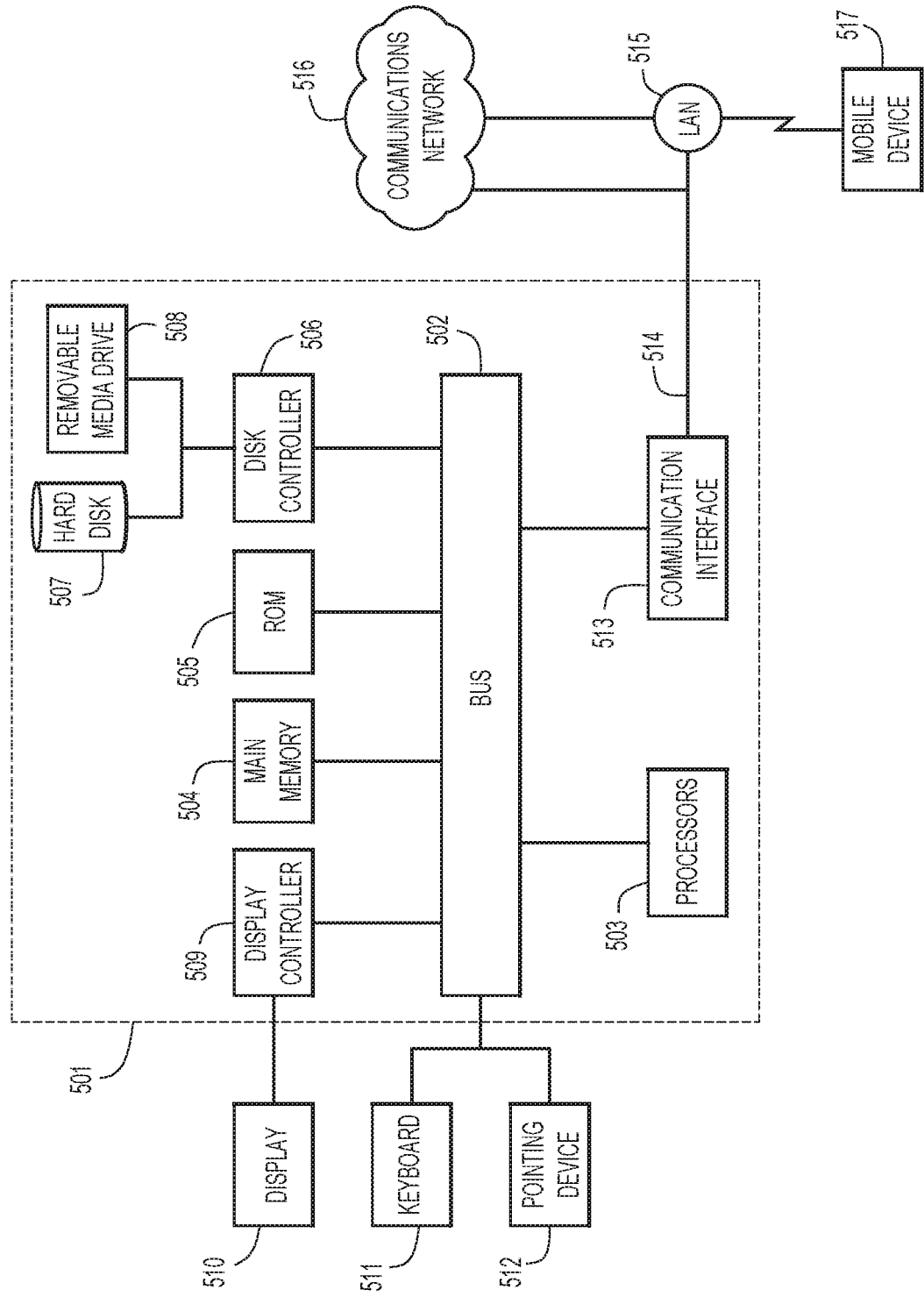
FIG. 5 is a simplified block diagram of a device that may be configured to perform methods presented herein, according to an example embodiment.

Referring now to FIG. 5, an example of a block diagram of a computer system 501 that may be representative of the network controller 110 in which the embodiments presented may be implemented is shown. The computer system 501 may be programmed to implement a computer based device, such as a network controller in a large scale, multi-site network deployment. The computer system 501 includes a bus 502 or other communication mechanism for communicating information, and a processor 503 coupled with the bus 502 for processing the information. While the figure shows a single block 503 for a processor, it should be understood that the processors 503 may represent a plurality of processing cores, each of which can perform separate processing. The computer system 501 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503.

The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive, solid state drive, etc.). The storage devices may be added to the computer system 501 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, include types of processing circuitry. The processing circuitry may be located in one device or distributed across multiple devices.

The computer system 501 may also include a display controller 509 coupled to the bus 502 to control a display 510, such as a cathode ray tube (CRT), liquid crystal display (LCD) or light emitting diode (LED) display, for displaying information to a computer user. The computer system 501 includes input devices, such as a keyboard 511 and a pointing device 512, for interacting with a computer user and providing information to the processor 503. The pointing device 512, for example, may be a mouse, a trackball, track pad, touch screen, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing steps of the operations presented herein in response to the processor 503 executing one or more sequences of one or more instructions contained in a memory, such as the main memory 504. Such instructions may be read into the main memory 504 from another computer readable storage medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the operations presented herein, and for enabling the computer system 501 to interact with a human user (e.g., a network administrator). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA), tablet computer, laptop computer, or cellular telephone.

In summary, the techniques presented herein leverage technical knowledge of a network, such as the devices, network paths, and device upgrade times, along with business requirements, such as downtime thresholds and critical systems, to calculate a device upgrade plan. The device upgrade plan minimizes network downtime and prioritizes critical systems while ensuring the fastest path to resolution. These techniques solve a real-world problem by leveraging different types of knowledge, such as knowledge of the network topology, knowledge of the individual network elements, and the context of a customer's specific business requirements.

In particular, the upgrade plan can selectively apply upgrades using knowledge of the network topology and the individual devices with the goal to minimize downtime on the critical paths, or minimize the overall downtime. Additionally, the upgrade plan ensures that the upgrades are applied to each network element in a manner that does not negatively impact other network elements. For instance, when one network element is downloading the upgrade package, the upgrade plan ensures that upstream network elements are not removed from service, since that would prevent the download.

Further, the upgrade plan selectively applies network upgrades with knowledge of the business use of portions of the network. In this way, the upgrade plan can coordinate the downtime of network elements according to when would cause the least disruption in the customer's use of the network.

The network controller may also leverage upgrade timing data from past or similar devices, either on the same customer's network or form other customers' networks, to predict device outage times. The community knowledge of the timing is used to improve the simulation of the upgrade process in the network.

Additionally, the network controller may display certain KPIs to a network administrator. For instance, the network controller may display what an uptime KPI currently is, and what it would be during and after installing the update. Monitoring the uptime KPI may highlight any service which would be affected in a way that would cause the service to fall below a required uptime KPI, which may have a monetary impact to the network provider.

With respect to security services, the techniques presented herein enable a network provider to deploy services that keep customers' networks secure by keeping updated on current software, which fixes vulnerabilities. The upgrades may be rolled out according to an optimized, data driven, upgrade plan, but also allows network administrators to designate critical portions of the network. This flexibility instills confidence in the customers that network upgrades will not affect their critical business functions.

In one form, a method is provided for a network controller to implement an update on a plurality of network elements with minimal disruption. The network controller receives a request to install the update on the plurality of network elements in one or more networks. Installing the update in each respective network element of the plurality of network elements removes the respective network element from operation for an outage duration of time. The network controller determines how network flows will be distributed in the one or more networks during the outage duration of each respective network element, and generates an update plan that includes timing for installing the update on each respective network element. The timing is based on how the network flows will be distributed in the one or more networks. The network controller installs the update in each respective network element according to the timing of the update plan.

In another form, an apparatus is provided comprising a network interface unit and a processor. The network interface unit is configured to communicate with a plurality of network elements in one or more networks. The processor is configured to receive a request to install an update on the plurality of network elements. Installing the update in each respective network element of the plurality of network elements removes the respective network element from operation for an outage duration of time. The processor is configured to determine how network flows will be distributed in the one or more networks during the outage duration of each respective network element. The processor is further configured to generate an update plan including timing for installing the update on each respective network element. The timing is based on how the network flows will be distributed in the one or more networks. The processor is also configured to cause the update to be installed in each respective network element according to the timing of the update plan.

In a further form, a non-transitory computer readable storage media is provided that is encoded with instructions that, when executed by a processor in a computing device, cause the processor to receive a request to install an update on a plurality of network elements in one or more networks. Installing the update in each respective network element of the plurality of network elements removes the respective network element from operation for an outage duration of time. The instructions cause the processor to determine how network flows will be distributed in the one or more networks during the outage duration of each respective network element and generate an update plan including timing for installing the update on each respective network element. The timing is based on how the network flows will be distributed in the one or more networks. The instructions further cause the processor to install the update in each respective network element according to the timing of the update plan.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure. In particular, the techniques presented herein with respect to upgrades of network elements are equally applicable to disruptive configuration changes of the network elements.

What is claimed is:

1. A method comprising:
   at a network controller, obtaining a request to install an update on a plurality of network elements in one or more networks, wherein installing the update in each respective network element of the plurality of network elements removes the respective network element from operation for an outage duration of time;

identifying at least one set of one or more critical network elements based on business factors associated with removing the one or more critical network elements from the one or more networks;

identifying one or more non-critical network elements that are similar to the one or more critical network elements based on a previous outage duration of time for installing a previous upgrade;

obtaining timing information related to installing the update on the one or more non-critical network elements;

generating an update plan including timing for installing the update on the one or more critical network elements, wherein the timing is based on the timing information related to installing the update on the one or more non-critical network elements; and directing the one or more critical network elements to install the update according to the timing of the update plan.

2. The method of claim 1, wherein the business factors include one or more of a determination that the set of one or more critical network elements be updated first, a time period during which the one or more critical network elements are prohibited from being updated, or a downtime allowed by a service level agreement for services that rely on the set of one or more critical network elements.

3. The method of claim 1, wherein the at least one set of one or more critical network elements defines a critical network path.

4. The method of claim 1, wherein the one or more non-critical network elements are edge network elements.

5. The method of claim 1, further comprising generating an update report comprising performance indicators of devices and services connected to the one or more networks.

6. The method of claim 5, wherein the performance indicators include an uptime percentage of the devices or services connected to the one or more networks.

7. The method of claim 1, wherein obtaining the timing information related to installing the update on the one or more non-critical network elements comprises obtaining the timing information from a central source of upgrade timing information, the central source collecting the upgrade timing information from a plurality of separate network devices in a plurality of networks operated by a community of separate entities.

8. An apparatus comprising:
a network interface unit configured to communicate with a plurality of network elements in one or more networks; and
a processor configured to:
obtain, via the network interface unit, a request to install an update on the plurality of network elements, wherein installing the update in each respective network element of the plurality of network elements removes the respective network element from operation for an outage duration of time;
identify at least one set of one or more critical network elements based on business factors associated with removing the one or more critical network elements from the one or more networks;
identify one or more non-critical network elements that are similar to the one or more critical network elements based on a previous outage duration of time for installing a previous upgrade;
obtain timing information related to installing the update on the one or more non-critical network elements;
generate an update plan including timing for installing the update on the one or more critical network elements, wherein the timing is based on the timing information related to installing the update on the one or more non-critical network elements; and
direct the one or more critical network elements via the network interface to install the update according to the timing of the update plan.

9. The apparatus of claim 8, wherein the business factors include one or more of a determination that the set of one or more critical network elements be updated first, a time period during which the one or more critical network elements are prohibited from being updated, or a downtime allowed by a service level agreement for services that rely on the set of one or more critical network elements.

10. The apparatus of claim 8, wherein the processor is configured to define the at least one set of one or more critical network elements as a critical network path.

11. The apparatus of claim 8, wherein the one or more non-critical network elements are edge network elements.

12. The apparatus of claim 8, wherein the processor is further configured to generate an update report comprising performance indicators of devices and services connected to the one or more networks.

13. The apparatus of claim 12, wherein the performance indicators include an uptime percentage of the devices or services connected to the one or more networks.

14. The apparatus of claim 8, wherein the process is configured to obtain the timing information related to installing the update on the one or more non-critical network elements by obtaining the timing information from a central source of upgrade timing information, the central source collecting the upgrade timing information from a plurality of separate network devices in a plurality of networks operated by a community of separate entities.

15. One or more non-transitory computer readable storage media encoded with computer executable instructions operable to cause a processor in a network controller to:
obtain a request to install an update on a plurality of network elements in one or more networks, wherein installing the update in each respective network element of the plurality of network elements removes the respective network element from operation for an outage duration of time;
identify at least one set of one or more critical network elements based on business factors associated with removing the one or more critical network elements from the one or more networks;
identify one or more non-critical network elements that are similar to the one or more critical network elements based on a previous outage duration of time for installing a previous upgrade;
obtain timing information related to installing the update on the one or more non-critical network elements;
generate an update plan including timing for installing the update on the one or more critical network elements, wherein the timing is based on the timing information related to installing the update on the one or more non-critical network elements; and
direct the one or more critical network elements to install the update according to the timing of the update plan.

16. The non-transitory computer readable storage media of claim 15, wherein the business factors include one or more of a determination that the set of one or more critical network elements be updated first, a time period during which the one or more critical network elements are prohibited from being updated, or a downtime allowed by a service level agreement for services that rely on the set of one or more critical network elements.

17. The non-transitory computer readable storage media of claim 15, further comprising instructions operable to cause the processor to define the at least one set of one or more critical network elements as a critical network path.

18. The non-transitory computer readable storage media of claim 15, wherein the one or more non-critical network elements are edge network elements.

19. The non-transitory computer readable storage media of claim 15, further comprising instructions operable to cause the processor to generate an update report comprising performance indicators of devices and services connected to the one or more networks.

20. The non-transitory computer readable storage media of claim 15, further comprising instructions operable to cause the processor to obtain the timing information related to installing the update on the one or more non-critical network elements by obtaining the timing information from a central source of upgrade timing information, the central source collecting the upgrade timing information from a plurality of separate network devices in a plurality of networks operated by a community of separate entities.

* * * * *